United States Patent [19]

Matsuo

[11] Patent Number: 4,923,292

[45] Date of Patent: May 8, 1990

[54] MACRO LENS SYSTEM

[75] Inventor: Hirofumi Matsuo, Tokyo, Japan

[73] Assignee: Asahi Kogaku Kogyo Kabushiki Kaisha, Tokyo, Japan

[21] Appl. No.: 314,005

[22] Filed: Feb. 23, 1989

[30] Foreign Application Priority Data

Feb. 23, 1988 [JP] Japan .................................. 63-40303

[51] Int. Cl.$^5$ .............................................. G02B 9/64
[52] U.S. Cl. ..................................................... 350/463
[58] Field of Search .......................... 350/463, 450, 428

[56] References Cited

U.S. PATENT DOCUMENTS 4,772,108 9/1988 Sugiyama ........................ 350/463 X
4,792,219 12/1988 Mihara ................................ 350/463

FOREIGN PATENT DOCUMENTS 21710 2/1983 Japan .
152414 8/1984 Japan .
228220 12/1984 Japan .
160412 7/1987 Japan .
195617 8/1987 Japan .

Primary Examiner—Scott J. Sugarman
Attorney, Agent, or Firm—Sughrue, Mion, Zinn, Macpeak & Seas

[57] ABSTRACT

A photographic macro lens system can be composed of, in order from the object side, a first group of a retrofocus type and a second group with a floating mechanism being provided between the two groups. The first group has, in order from the object side, a negative meniscus lens having a convex surface directed toward the object, a positive lens having a surface of large curvature directed toward the object, a negative meniscus lens having a convex surface directed toward the object, a negative lens having a surface of large curvature directed toward the object across an aerial distance having a diaphragm stop, a positive lens having a surface of large curvature directed toward the image, and a positive lens. The second group has, in order from the object side, a negative lens element and a positive lens element. The macro lens system is compact and compensates for aberration over a wide shooting range from infinity to a life-size shot and can still be operated in a mechanically stable manner.

10 Claims, 4 Drawing Sheets

MACRO LENS SYSTEM

BACKGROUND OF THE INVENTION

The present invention relates to a photographic macro lens system. More particularly the present invention relates to a compact macro lens system that employs a floating mechanism with the overall lens system being divided into two groups, and in which the distance between the retrofocus first group and the second group is adjusted to ensure good performance over a wide shooting range including a life-size shot.

Conventional photographic lens systems are designed to perform aberrational compensation using an infinite distance as a reference. On the other hand macro lens systems adopt a close distance as a reference for aberrational compensation. Macro lens systems are also frequently used in ordinary photographic shooting in which achieving effective aberrational compensation over a wide shooting range from the closest distance to infinity is desired. In response to this need, some macro lens systems enable shooting over a wide range including a life-size shot (1 x) by adopting a floating mechanism, e.g., the systems described in JP-A-No. 59-228220 and JP-A-No. 62-195617 (the term "JP-A" as used herein means an "unexamined published Japanese patent application"). A macro lens system employing a retrofocus first lens group is described in JP-No. 62-160412.

The adoption of a floating mechanism has been successful to some extent in solving the problem on account of the change in shooting distance. However, this approach suffers disadvantages that are inherent to the floating mechanism such as the need to divide the overall lens system into three groups.

A macro lens system employing a retrofocus first group does not completely perform efficient aberrational compensation. In other words, in response to a change in the shooting distance from infinity to life size the system will experience great variations in aberration and in particular astigmatism.

SUMMARY OF THE INVENTION

An object, therefore, of the present invention is to provide a compact macro lens system that ensures efficient aberrational compensation over a wide shooting range from infinity to life size (1 x) and yet can be operated in a mechanically stable manner.

In order to attain this object, the overall system of the present invention is divided into two groups, the first of which is of a retrofocus type, and a floating mechanism is provided between the first and second groups. The macro lens system of the present invention comprises a first group which comprises, in order from the object side, a first lens element which is a positive lens having a a convex surface directed toward the object, a second lens element which is a positive lens having a surface of large curvature directed toward the object, a third lens element which is a negative meniscus lens having a convex surface directed toward the object, a fourth lens element which is a negative lens having a surface of large curvature directed toward the object across an aerial distance having a diaphragm stop, a fifth lens element which is a positive lens having a surface of large curvature directed toward the image, and a sixth lens element which is a positive lens, and a second group which comprises a negative seventh lens element and a positive eighth lens element. When the system is focused from infinity to a close distance, both the first and second groups are moved toward the object with their distance increasing. The macro lens system of the present invention further satisfies the following conditions, $$1.05 < f/f_I < 1.3 \tag{1}$$

$$f/|f_3| < 0.8, (f_3 < 0) \tag{2}$$

$$1.0 < r_5/(d_5 + d_6/2) < 3.0 \tag{3}$$

$$1.0 < r_6/(d_6/2) < 3.0$$

$$0.5 < \frac{d_1 + d_2 + d_3 + d_4 + d_5 + d_6/2}{f} < 0.8 \tag{4}$$

wherein
f is the focal length of the overall system;
$f_I$ is the focal length of the first group;
$f_3$ is the focal length of the third lens element;
$r_i$ is the radius of curvature of an $i^{th}$ surface from the object side: and
$d_i$ is the distance between an $i^{th}$ surface from the object side and an $(i+1)^{th}$ surface from the object side.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENT

The criticality of conditions (1) to (4) to be satisfied by the macro lens system of the present invention is described hereinafter.

Condition (1) relates to the floating mechanism in the system of the present invention and sets forth the requirement to be met by the refractive power of the first lens group. If the lower limit of this condition is not reached (i.e., the refractive power of the first group is to small), the amount of focusing increases, which is not favorable for the purpose of realizing a compact system. If the upper limit of condition (1) is exceeded (i.e., the refractive power of the second group is excessive), the variations in spherical aberration and coma that occur in response to a change in the shooting distance cannot be effectively suppressed. Condition (1) necessarily requires that the second lens group have a weak negative refractive power and this offers the advantage of reducing the effects of lens decentering due to floating.

Condition (2) requires that the third lens element (i.e., the negative lens on the object side which is adjacent to the diaphragm stop) be a negative meniscus lens having a weak refractive power. When both condition (2) and condition (3) which is necessary for providing a lens configuration that is concentric with the diaphragm stop are satisfied, the incident angle of rays ranging from axial rays to most marginal extra-axial rays that are launched into the third lens element can be minimized, thereby reducing astigmatism. At the same time, better symmetry can be attained with respect to the diaphragm stop. Therefore, condition (2) is necessary for the additional purpose of achieving effective compensation for coma and distortion. If the upper limit of this condition is exceeded (i.e., when a macro lens system which adopts a first lens group of the known Gauss type is used). the variations that will be caused in the image plane by the third lens element are too great to achieve efficient compensation for curvature of the field and astigmatism.

Condition (3) which is related to condition (2) sets forth the requirements that should be satisfied by the radii of curvature of the third lens element ($r_5$, $r_6$) If the upper limit of this condition is exceeded, the concentricity of $r_5$ and $r_6$ with the diaphragm stop is lost and a problem such as increased astigmatism will inevitably occur. In particular, the increase in astigmatism will inevitably occur on account of a curved sagittal image plane. If the lower limit of condition (3) is not reached, the radii of curvature $r_5$ and $r_6$ will be reduced to levels that are too small to ensure precise and easy lens working.

Figure 1:
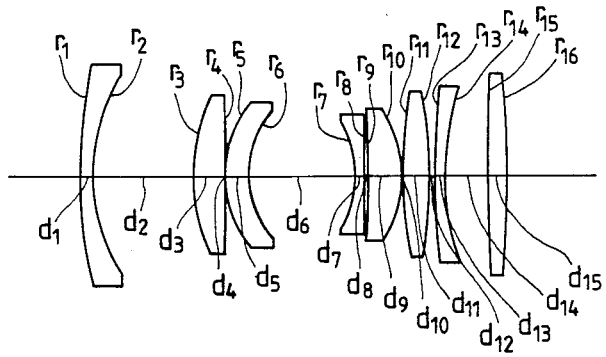
FIG. 1 is a simplified cross-sectional view of the macro lens system according to Example 1 of the present invention.
Figure 4:
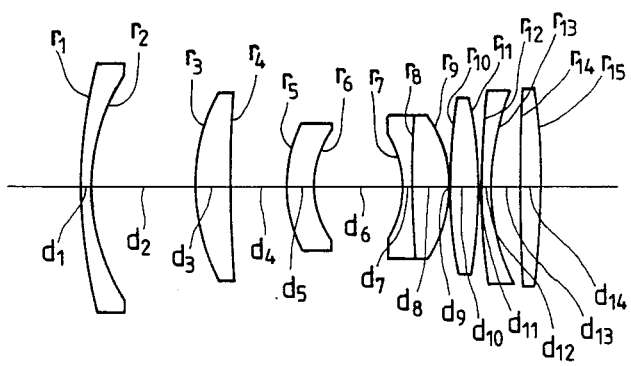
FIG. 4 is a simplified cross-sectional view of the macro lens system according to Example 2 of the present invention.
Figure 7:
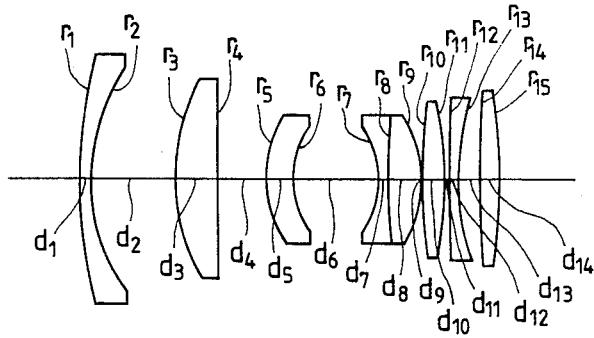
FIG. 7 is a simplified cross-sectional view of the macro lens system according to Example 3 of the present invention.
Figure 2:
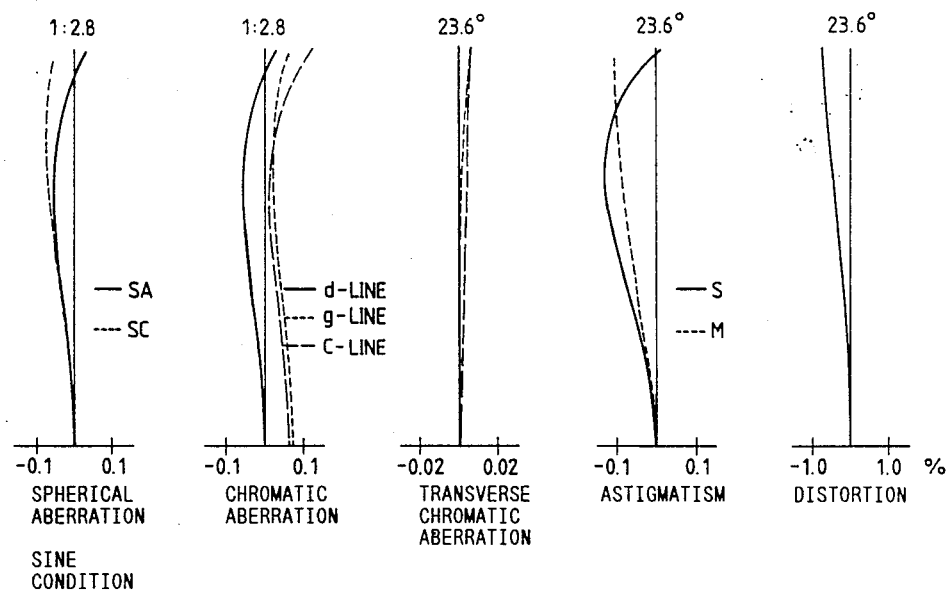
FIG. 2 is a graph plotting the aberration curves obtained with the macro lens system of Example 1 when it is focused for an object at infinity.
Figure 3:
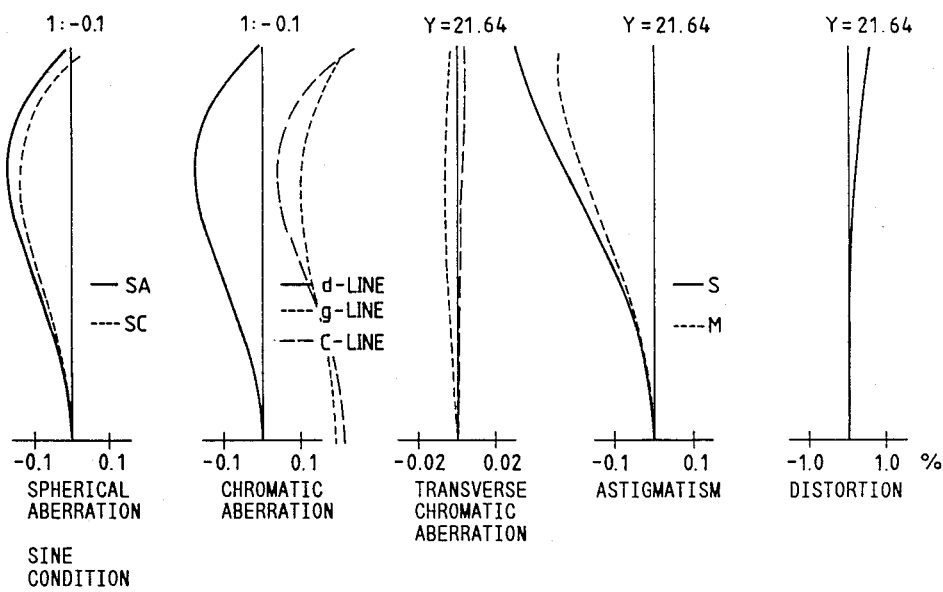
FIG. 3 is a graph plotting the aberration curves obtained with the macro lens system of Example 1 when it is focused for a life-size shot.
Figure 5:
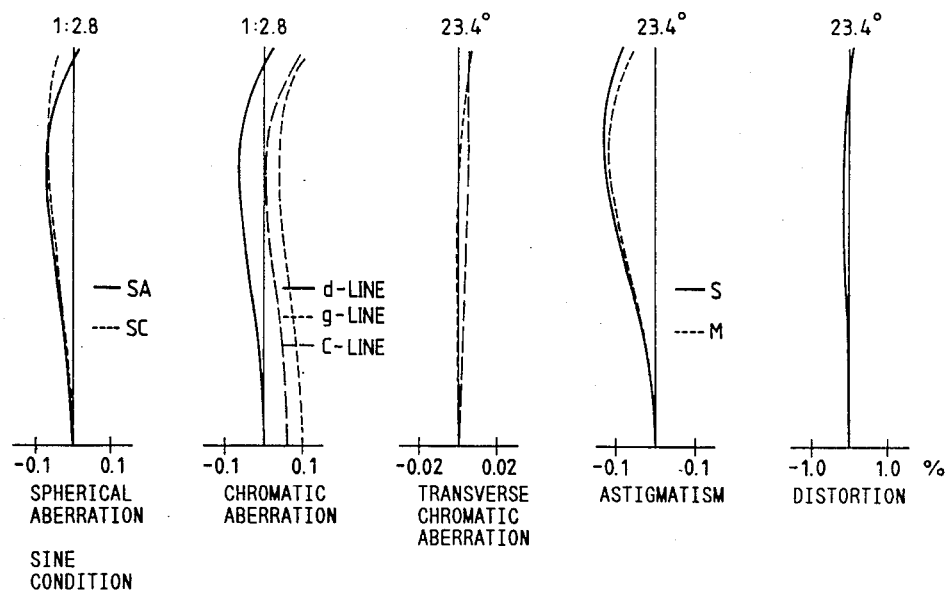
FIG. 5 is a graph plotting the aberration curves obtained with the macro lens system of Example 2 when it is focused for an object at infinity.
Figure 6:
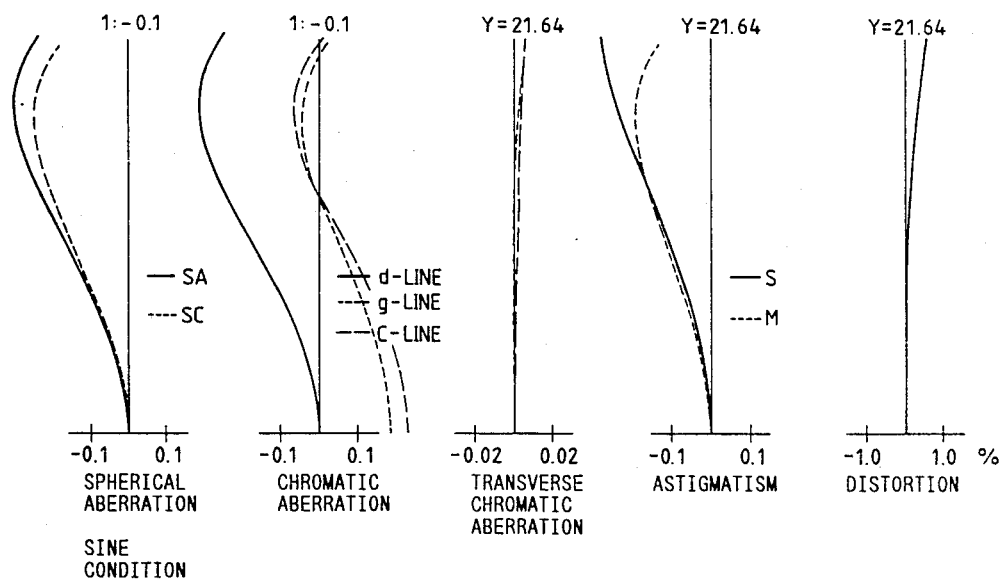
FIG. 6 is a graph plotting the aberration curves obtained with the macro lens system of Example 2 when it is focused for a life-size shot.
Figure 8:
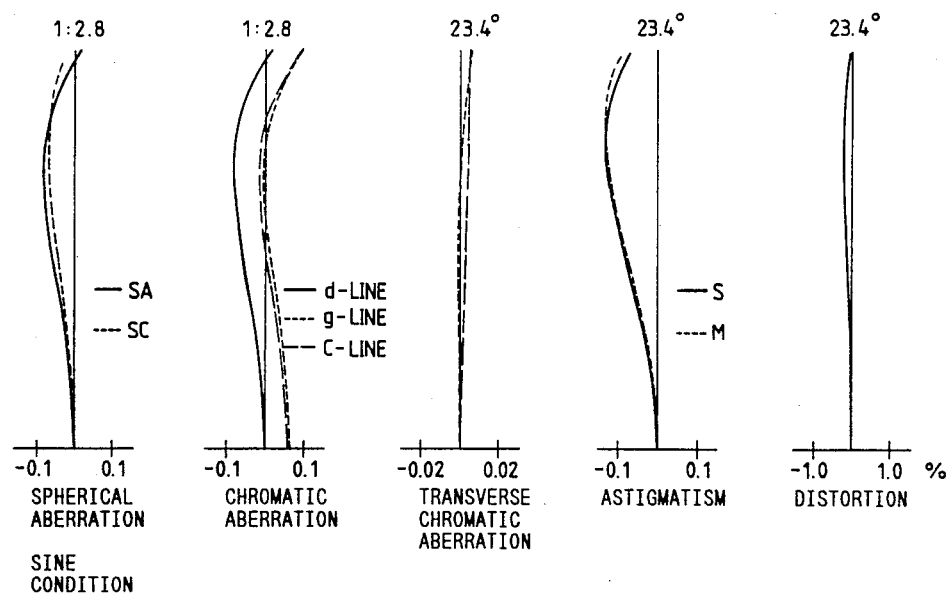
FIG. 8 is a graph plotting the aberration curves obtained with the macro lens system of Example 3 when it is focused for an object at infinity.
Figure 9:
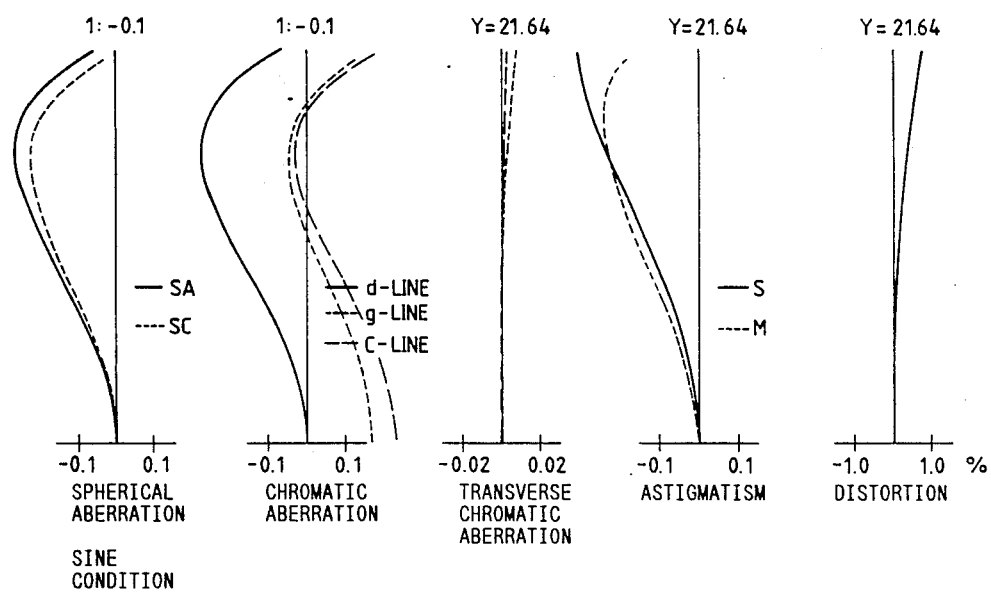
FIG. 9 is a graph plotting the aberration curves obtained with the macro lens system of Example 3 when it is focused for a life-size shot.

Referring to FIG. 1, those components of the first lens group which are closer to the image than the diaphragm stop comprise part of a Gauss type lens. Among these components, the absolute value of the curvature radius of the surface which is closest to the diaphragm stop (i.e.. the surface of the fourth lens element on the object side) and the absolute value of the radius of curvature of the surface of the positive lens element (i.e., the fifth lens) on the image side are preferably close to $r_6$ and $r_5$, respectively, from the viewpoint of symmetry.

Condition (4) sets forth the requirement that should be met by the distance from the first lens element to a position which is approximately equal to that of the diaphragm stop. If the lower limit of this condition is not reached, the result will be unfavorable for effective astigmatism compensation. If the upper limit of condition 4) is exceeded, an intended compact lens system cannot be realized Three specific examples of the present invention are described below with reference to data sheets, wherein: $F_{NO}$ denotes an F number; f, focal length; $\omega$, half viewing angle; $f_B$, back focus; r, the radius of curvature of an individual lens surface; d, distance between adjacent lens surfaces; n, the refractive index of an individual lens at the d-line; and $\gamma$, the Abbe number of each lens.

EXAMPLE 1

EXAMPLE 1
$F_{NO} = 1:2.8$   $f = 49.97$
$\omega = 23.6°$   $f_B = 37.90$

| Surface No. | r | d | n | $\nu$ |
|---|---|---|---|---|
| 1 | 64.495 | 1.65 | 1.51633 | 64.1 |
| 2 | 24.144 | 14.08 | | |
| 3 | 22.308 | 4.16 | 1.58313 | 59.4 |
| 4 | 2539.384 | 0.10 | | |
| 5 | 14.753 | 3.06 | 1.69895 | 30.1 |
| 6 | 12.304 | 14.55 | | |
| 7 | −15.364 | 1.30 | 1.80518 | 25.4 |
| 8 | 308.065 | 0.52 | | |
| 9 | −121.136 | 4.28 | 1.72000 | 46.0 |
| 10 | −19.091 | 0.46 | | |
| 11 | 57.740 | 3.42 | 1.80610 | 40.9 |
| 12 | −69.466 | 1.00 | | |
| 13 | 121.956 | 1.30 | 1.74950 | 35.3 |
| 14 | 40.950 | 5.69 | | |
| 15 | 220.799 | 2.64 | 1.74077 | 27.8 |
| 16 | −121.188 | | | |

(1) $f/f_I = 1.15$
(2) $f/|f_3| = 0.23$
(3) $r_5/(d_5 + d_6/2) = 1.427$
    $r_6/(d_6/2) = 1.691$ (4) $\dfrac{d_1 + d_2 + d_3 + d_4 + d_5 + d_6/2}{f} = 0.607$ $d_{12} = 17.19$ (for a life-size shot).
$f_B = 65.47$

EXAMPLE 2

EXAMPLE 2
$F_{NO} = 1:2.8$   $f = 50.01$
$\omega = 23.4°$   $f_B = 38.02$

| Surface No. | r | d | n | $\nu$ |
|---|---|---|---|---|
| 1 | 61.748 | 1.50 | 1.62012 | 49.6 |
| 2 | 28.608 | 14.34 | | |
| 3 | 26.525 | 4.94 | 1.69680 | 55.5 |
| 4 | 197.685 | 7.57 | | |
| 5 | 18.425 | 3.79 | 1.59270 | 35.3 |
| 6 | 13.550 | 12.06 | | |
| 7 | −12.947 | 1.30 | 1.69895 | 30.1 |
| 8 | 129.576 | 5.05 | 1.69680 | 55.5 |
| 9 | −17.827 | 0.05 | | |
| 10 | 67.312 | 3.68 | 1.79952 | 42.2 |
| 11 | −59.770 | 0.65 | | |
| 12 | 125.474 | 1.30 | 1.69350 | 53.2 |
| 13 | 34.560 | 3.72 | | |
| 14 | 171.423 | 3.00 | 1.60323 | 42.3 |
| 15 | −90.000 | | | |

(1) $f/f_I = 1.206$
(2) $f/|f_3| = 0.411$
(3) $r_5/(d_5 + d_6/2) = 1.876$
    $r_6/(d_6/2) = 2.247$ (4) $\dfrac{d_1 + d_2 + d_3 + d_4 + d_5 + d_6/2}{f} = 0.763$ $d_{11} = 12.75$ (for a life-size shot),
$f_B = 68.82$

EXAMPLE 3

EXAMPLE 3
$F_{NO} = 1:2.8$  $f = 49.98$
$\omega = 23.4°$  $f_B = 40.04$

| Surface No. | r | d | n | ν |
|---|---|---|---|---|
| 1 | 64.290 | 1.50 | 1.61405 | 55.0 |
| 2 | 26.770 | 11.59 | | |
| 3 | 26.134 | 6.01 | 1.60311 | 60.7 |
| 4 | 1322.823 | 6.82 | | |
| 5 | 16.253 | 3.80 | 1.80518 | 25.4 |
| 6 | 12.801 | 11.89 | | |
| 7 | −12.939 | 1.20 | 1.69895 | 30.1 |
| 8 | 114.481 | 4.70 | 1.69680 | 55.5 |
| 9 | −17.651 | 0.05 | | |
| 10 | 77.782 | 2.97 | 1.80610 | 40.9 |
| 11 | −51.908 | 0.75 | | |
| 12 | 406.012 | 1.30 | 1.69350 | 53.2 |
| 13 | 38.351 | 2.72 | | |
| 14 | 152.956 | 2.84 | 1.60323 | 42.3 |
| 15 | −73.724 | | | |

(1) $f/f_I = 1.206$
(2) $f/|f_3| = 0.340$
(3) $r_5/(d_5 + d_6/2) = 1.668$
    $r_6/(d_6/2) = 2.153$ (4) $\dfrac{d_1 + d_2 + d_3 + d_4 + d_5 + d_6/2}{f} = 0.713$ $d_{11} = 14.25$ (for a life-size shot),
$f_B = 68.74$ As previously described, the macro lens system of the present invention adopts a floating mechanism, with the overall lens system being divided into two groups, and the second group is provided with a weak negative refractive power. Because of the weak negative refractive power of the second group, any deleterious effects of lens decentering that will be caused by the floating action can be sufficiently reduced to realize a lens system which is mechanically stable. Since the system of the present invention satisfies conditions (1)–(4) set forth herein, the focal length of the first lens group can be made smaller than that of the overall lens system. This contributes to the fabrication of a compact lens system which requires a smaller amount of lens movement during focusing. As a further advantage, the macro lens system of the present invention ensures good performance over a wide shooting range extending from infinity to life size.

What is claimed is:

1. A macro lens system comprising a first group which comprises, in order from a side of an object, a first lens element which is a negative meniscus lens, a second lens element which is a positive lens, a third lens element which is a negative meniscus lens, a fourth lens element which is a negative lens, a diaphragm stop, a fifth lens element which is a positive lens, and a sixth lens element which is a positive lens, and a second group which comprises a negative seventh lens element and a positive eighth lens element, both the first and second groups being moved toward the object with their distance increasing when said system is focused from infinity to a close distance, said system further satisfying the following conditions:

$$1.05 < f/f_I < 1.3 \tag{1}$$

$$f/|f_3| < 0.8, (f_3 < 0) \tag{2}$$

$$1.0 < r_5/(d_5 + d_6/2) < 3.0 \tag{3}$$

$$1.0 < r_6/(d_6/2) < 3.0$$

$$0.5 < \dfrac{d_1 + d_2 + d_3 + d_4 + d_5 + d_6/2}{f} < 0.8 \tag{4}$$

wherein
f is the focal length of the overall system;
$f_I$ is the focal length of the first group;
$f_3$ is the focal length of the third lens element;
$r_i$ is the radius of curvature of an $i^{th}$ surface from the object side; and
$d_i$ is the distance between an $i^{th}$ surface from the object side and an $(i+1)^{th}$ surface from the object side.

2. A macro lens system as claimed in claim 1, further satisfying the following conditions:

$F_{NO} = 1:2.8$  $f = 49.97$
$\omega = 23.6°$  $f_B = 37.90$

| Surface No. | r | d | n | ν |
|---|---|---|---|---|
| 1 | 64.495 | 1.65 | 1.51633 | 64.1 |
| 2 | 24.144 | 14.08 | | |
| 3 | 22.308 | 4.16 | 1.58313 | 59.4 |
| 4 | 2539.384 | 0.10 | | |
| 5 | 14.753 | 3.06 | 1.69895 | 30.1 |
| 6 | 12.304 | 14.55 | | |
| 7 | −15.364 | 1.30 | 1.80518 | 25.4 |
| 8 | 308.065 | 0.52 | | |
| 9 | −121.136 | 4.28 | 1.72000 | 46.0 |
| 10 | −19.091 | 0.46 | | |
| 11 | 57.740 | 3.42 | 1.80610 | 40.9 |
| 12 | −69.466 | 1.00 | | |
| 13 | 121.956 | 1.30 | 1.74950 | 35.3 |
| 14 | 40.950 | 5.69 | | |
| 15 | 220.799 | 2.64 | 1.74077 | 27.8 |
| 16 | −121.188 | | | |

(1) $f/f_I = 1.15$
(2) $f/|f_3| = 0.23$
(3) $r_5/(d_5 + d_6/2) = 1.427$
    $r_6/(d_6/2) = 1.691$ (4) $\dfrac{d_1 + d_2 + d_3 + d_4 + d_5 + d_6/2}{f} = 0.607$ $d_{12} = 17.19$ (for a life-size shot),
$f_B = 65.47$ wherein $F_{NO}$ denotes an F number; $\omega$ is the half viewing angle; $f_B$ is a back focus; and $\gamma$ is the Abbe number of each lens.

3. A macro lens system as claimed in claim 1, further satisfying the following conditions:

$F_{NO} = 1:2.8$  $f = 50.01$
$\omega = 23.4°$  $f_B = 38.02$

| Surface No. | r | d | n | ν |
|---|---|---|---|---|
| 1 | 61.748 | 1.50 | 1.62012 | 49.6 |
| 2 | 28.608 | 14.34 | | |
| 3 | 26.525 | 4.94 | 1.69680 | 55.5 |
| 4 | 197.685 | 7.57 | | |
| 5 | 18.425 | 3.79 | 1.59270 | 35.3 |
| 6 | 13.550 | 12.06 | | |
| 7 | −12.947 | 1.30 | 1.69895 | 30.1 |
| 8 | 129.576 | 5.05 | 1.69680 | 55.5 |
| 9 | −17.827 | 0.05 | | |
| 10 | 67.312 | 3.68 | 1.79952 | 42.2 |
| 11 | −59.770 | 0.65 | | |
| 12 | 125.474 | 1.30 | 1.69350 | 53.2 |

-continued $F_{NO} = 1:2.8 \quad f = 50.01$
$\omega = 23.4° \quad f_B = 38.02$

| | | | | |
|---|---|---|---|---|
| 13 | 34.560 | 3.72 | | |
| 14 | 171.423 | 3.00 | 1.60323 | 42.3 |
| 15 | −90.000 | | | |

(1) $f/f_I = 1.206$
(2) $f/|f_3| = 0.411$
(3) $r_5/(d_5 + d_6/2) = 1.876$
$r_6/(d_6/2) = 2.247$ (4) $\dfrac{d_1 + d_2 + d_3 + d_4 + d_5 + d_6/2}{f} = 0.763$ $d_{11} = 12.75$ (for a life-size shot).
$f_B = 68.82$ wherein $F_{NO}$ denotes an F number; $\omega$ is the half viewing angle; $f_B$ is a back focus; and $\gamma$ is the Abbe number of each lens.

4. A macro lens systems as claimed in claim 1, further satisfying the following conditions:

$F_{NO} = 1:2.8 \quad f = 49.98$
$\omega = 23.4° \quad f_B = 40.04$

| Surface No. | r | d | n | ν |
|---|---|---|---|---|
| 1 | 64.290 | 1.50 | 1.61405 | 55.0 |
| 2 | 26.770 | 11.59 | | |
| 3 | 26.134 | 6.01 | 1.60311 | 60.7 |
| 4 | 1322.823 | 6.82 | | |
| 5 | 16.253 | 3.80 | 1.80518 | 25.4 |
| 6 | 12.801 | 11.89 | | |
| 7 | −12.939 | 1.20 | 1.69895 | 30.1 |
| 8 | 114.481 | 4.70 | 1.69680 | 55.5 |
| 9 | −17.651 | 0.05 | | |
| 10 | 77.782 | 2.97 | 1.80610 | 40.9 |
| 11 | −51.908 | 0.75 | | |
| 12 | 406.012 | 1.30 | 1.69350 | 53.2 |
| 13 | 38.351 | 2.72 | | |
| 14 | 152.956 | 2.84 | 1.60323 | 42.3 |
| 15 | −73.724 | | | |

(1) $f/f_I = 1.206$
(2) $f/|f_3| = 0.340$
(3) $r_5/(d_5 + d_6/12) = 1.668$

-continued $F_{NO} = 1:2.8 \quad f = 49.98$
$\omega = 23.4° \quad f_B = 40.04$ $r_6/(d_6/2) = 2.153$ (4) $\dfrac{d_1 + d_2 + d_3 + d_4 + d_5 + d_6/2}{f} = 0.713$ $d_{11} = 14.25$ (for a life-size shot).
$f_B = 68.74$ wherein $F_{NO}$ denotes an F number; $\omega$ is the half viewing angle; $f_B$ is a back focus; and $\gamma$ is the Abbe number of each lens.

5. A macro lens system comprising a first group which comprises, in order from a side of an object, a first lens element which is a negative meniscus lens, a second lens element which is a positive lens, a third lens element which is a negative meniscus lens, a fourth lens element which is a negative lens, a diaphragm stop, a fifth lens element which is a positive lens, and a sixth lens element which is a positive lens, and a second group which comprises a negative seventh lens element and a positive eighth lens element, both the first and second groups being moved toward the object with their distance increasing when said system is focused from infinity to a close distance.

6. A macro lens system as claimed in claim 5, wherein a focal length of said first group is smaller than a focal length of the overall system.

7. A macro lens system as claimed in claim 5, wherein said second lens group has a weak negative refractive power.

8. A macro lens system as claimed in claim 5, wherein said third lens element is a negative meniscus lens having a weak refractive power.

9. A macro lens system as claimed in claim 5, wherein radii of curvature of the surfaces of said third lens element are in a range such that they are concentric with said diaphragm stop.

10. A macro lens system as claimed in claim 5, wherein the absolute value of the curvature of radii of the surfaces of said fourth lens element and said fifth lens element are approximately the same as the radii of curvature of the surfaces of said third lens element.

* * * * *